J. B. MACKEY.
AGRICULTURAL IMPLEMENT.
APPLICATION FILED JAN. 22, 1920.
1,342,125.
Patented June 1, 1920.
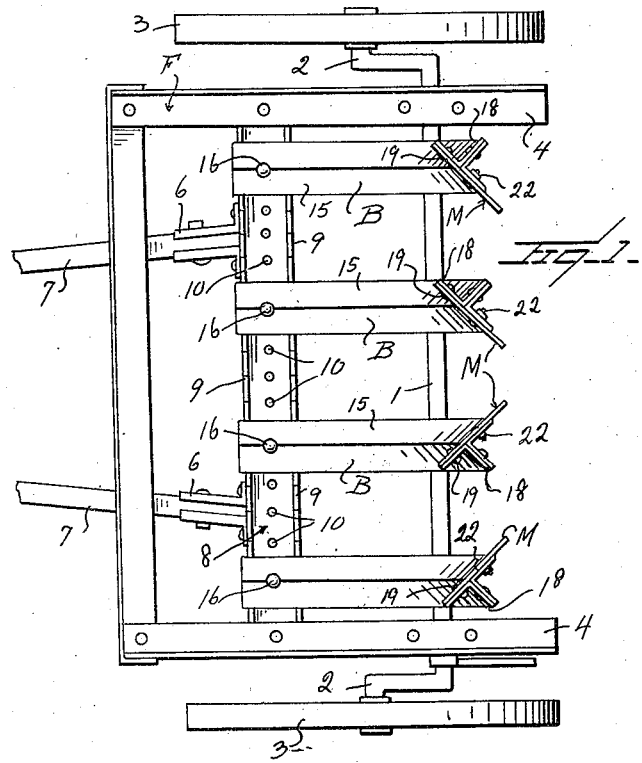
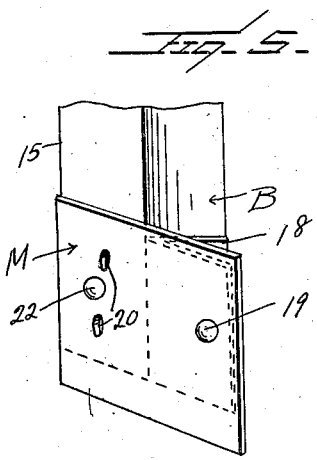
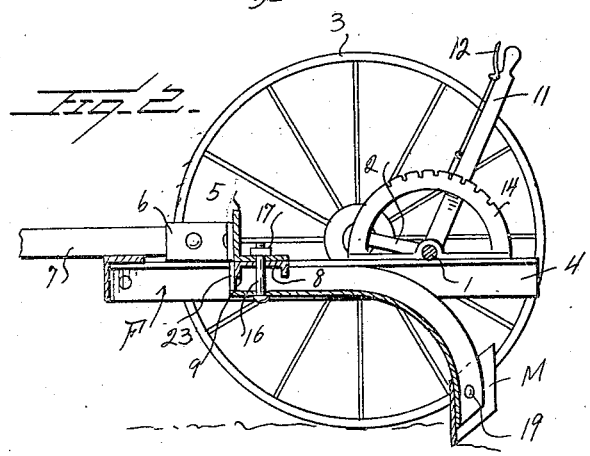
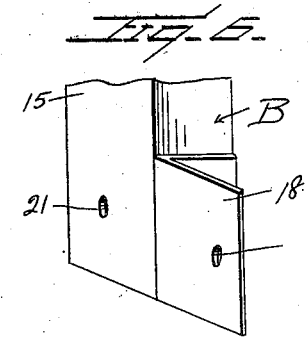
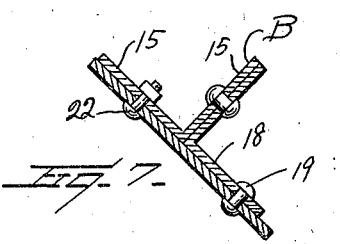
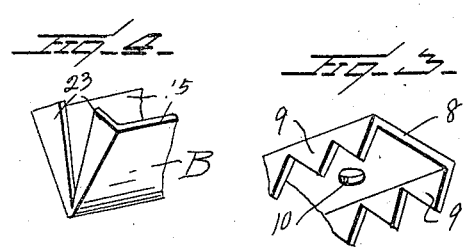
Inventor
J. B. Mackey
By Watson E. Coleman
Attorney

UNITED STATES PATENT OFFICE.

JOHN B. MACKEY, OF HOP BOTTOM, PENNSYLVANIA.

AGRICULTURAL IMPLEMENT.

1,342,125.  Specification of Letters Patent.  Patented June 1, 1920.

Application filed January 22, 1920. Serial No. 353,244.

*To all whom it may concern:*

Be it known that I, JOHN B. MACKEY, a citizen of the United States, residing at Hop Bottom, in the county of Susquehanna and State of Pennsylvania, have invented certain new and useful Improvements in Agricultural Implements, of which the following is a specification, reference being had to the accompanying drawings.

This invention relates to certain improvements in agricultural implements and it is an object of the invention to provide a novel and improved device of this general character which can be readily employed for a multiplicity of uses and particularly for the purpose of cultivating, hilling, topping or weeding, and also for the purpose of marking.

Another object of the invention is to provide a novel and improved device of this general character including a portable body adapted to be drawn by a draft animal or otherwise and which has applied thereto a plurality of beams or legs, each of which being provided with a ground working member.

An additional object of the invention is to provide a novel and improved device of this general character wherein the ground working member carried by each of the beams or legs comprises a substantially rectangular plate having its flat faces vertically disposed and wherein means are provided for adjusting said plate in a vertical direction about a horizontal axis so that said plate may be arranged in a position in accordance with the character of the work to be performed.

A still further object of the invention is to provide a novel and improved device of this general character embodying a portable body provided with a plurality of beams or legs, each of which carrying a ground working member and wherein said legs or beams may be readily interchanged so that the ground working members carried by said beams or legs can be arranged in a manner to permit the same to be employed either for the purpose of hilling or topping.

Another object of the invention is to provide a novel and improved device of this general character comprising a portable frame including a transversely disposed member provided with depending toothed flanges and wherein a plurality of beams or legs for ground working members are employed, each of said beams or legs being substantially V-shape in cross section and adapted to interlock with the teeth of the flanges together with means for clamping said beam or leg in such position.

The invention consists in the details of construction and in the combination and arrangement of the several parts of my improved implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in bottom plan of an agricultural implement constructed in accordance with an embodiment of my invention, the draft rigging being shown in fragment;

Fig. 2 is a fragmentary sectional view taken through the device as illustrated in Fig. 1;

Fig. 3 is a fragmentary view in perspective of the toothed plate carried by the frame or body of the implement;

Fig. 4 is a fragmentary view in perspective of the end portion of a leg or beam coacting with said toothed plate;

Fig. 5 is a fragmentary view in perspective of a ground working member and the portion of a leg or beam with which the same coacts.

Fig. 6 is a view similar to Fig. 5 with the ground working member omitted, showing in detail the bracket carried by the leg or beam with which the ground working member is pivotally engaged; and Fig. 7 is a transverse sectional view taken through the lower portion of the structure illustrated in Fig. 5.

As herein disclosed, 1 denotes an arched axle provided at its opposite end portions with the spindles 2 upon which the wheels 3 are rotatably engaged.

Supported by the intermediate portion of the arched axle 1 is an underslung frame F herein disclosed as U-shaped in form with its intermediate or base portions forwardly directed. Supported by the side members 4 of the frame F at a predetermined point rearwardly of the front thereof is a transversely disposed angle beam 5 having one flange vertically disposed. Secured to the vertical flange of the beam 5 are the forwardly directed plates or brackets 6 with which the fills or shafts 7 are adapted to be coupled. By this means, it is to be particularly noted that the strain of draft is imposed directly upon the beam 5. It is also to be understood that in the present embodiment of my invention, the implement is adapted to be drawn by a single draft animal although it is to be understood that I do not wish to limit myself in this respect as a team of animals may be used when the occasions of practice may so require.

Suitably secured to the under face of the beam 5 and extending longitudinally thereof is a plate 8 having its longitudinal marginal portions defined by the depending toothed flanges 9 extending the entire length thereof. The lower or horizontal flange of the beam 5 and the underlying plate 8 have disposed therethrough a plurality of longitudinally spaced openings 10 for the purpose to be hereinafter more particularly referred to.

Suitably engaged with the axle 1 is a lever 11 carrying a latch mechanism 12 coacting with a rack 14 carried by the frame F. Through the instrumentality of the lever 11 the arched axle 1 may be raised or lowered as may be required so that the ground working members, to be hereinafter referred to, may be lifted free of the ground or the extent of penetration of said members readily and conveniently regulated.

Coacting with the plate 8 is a plurality of rearwardly directed beams or legs B. Each of these beams or legs B is disposed longitudinally on a predetermined curvature and is U-shape in cross section with its apex downwardly and forwardly directed. It is preferred that the side members 15 of the beam or leg B be substantially perpendicularly related or at right angles one to the other. The free longitudinal marginal portions of the beam or leg B are adapted to intermesh or interlock with the teeth of the depending flanges 9 carried by the plate 8 and said end portion of the beam or leg B is clamped in such position through the medium of an upstanding bolt 16 disposed through the beam or leg B and one of the openings 10 hereinbefore referred to. Coacting with the bolt 16 and with the beam 5 is a clamping nut 17. By this particular means of attaching or securing the beam or leg B may be positioned at different points longitudinally of the beam 5 and also that one of the beams or legs B may be readily interchanged with another when the occasions of practice may so necessitate.

Secured to the outer face of a side member of each of the beams or legs B adjacent its rear or free end is a rearwardly directed plate 18 substantially flush with the second side member 15 of the leg or beam. M denotes a substantially rectangular ground working member having its flat faces vertically disposed and overlying the plate 18 and the adjacent side member 15 of the beam or leg B. The end portion of the member M is pivotally engaged as at 19 with the plate 18 while the opposite end portion of the plate M is provided with a series of arcuately arranged spaced openings 20, each of which being adapted to register with the opening 21 in a side member 15. Disposed through the registering openings 20 and 21 is a holding bolt 22. By this means, it will be at once understood that the member M may be held in definite vertical adjustments about the rivet or pivotal connection 19 in accordance with the character of the work to be performed.

As is particularly illustrated in Fig. 4, it is to be noted that the side members 15 of each of the beams or legs B terminate in the inwardly directed flanges 23 which are adapted to contact with the forward flange 9 of the plate 8 whereby said flanges 23 operate as stops to limit the rearward movement of the beam or leg B with respect to the plate 8 so that in assembling the implement the coacting bolt 16 may be readily applied.

In the present embodiment of my invention and as particularly illustrated in Fig. 1, the implement comprises four beams or legs B and as is indicated in Fig. 2, the implement is in the character of a straddle row. The intermediate members M, as illustrated in Fig. 1, are in such adjustment as to hill and row, although this same adjustment permits the implement to be used in the purpose of topping. With the members M adjusted upon the required inclination, the same can also be effectively employed for the purpose of weeding and particularly in connection with a row of corn. In a weeding operation, it is preferred that each of the two central members M be interchanged from what is shown in Fig. 1 and in which second position, it is preferred that said members M be arranged when the device is used for weeding.

From the foregoing description, it is thought to be obvious that an implement constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. An agricultural implement of the class described comprising a portable body, a leg carried thereby and depending therefrom, the end portion of the leg remote from the frame being substantially V-shape in cross section, an outstanding plate carried by one side member of the leg, a ground working member pivotally engaged with said plate and extending across the second said member of the leg, and means coacting with the plate and the leg for holding the ground working member against swinging movement, said ground working member being substantially flat with its flat faces vertically disposed.

2. An agricultural implement of the class described comprising a portable frame, a member carried thereby and provided with depending toothed flanges, a leg substantially V-shape in cross section having its free longitudinal marginal portions interlocking with the teeth of the flanges, means coacting with the leg and member for maintaining the leg interlocked with the teeth of the flanges, and a ground working member carried by the leg.

3. An agricultural implement of the class described comprising a portable frame, a member carried thereby and provided with depending toothed flanges, a leg substantially V-shaped in cross section having its free longitudinal marginal portions interlocking with the teeth of the flanges, an end portion of the leg being provided with inwardly directed flanges adapted to contact with the member for limiting the movement of the leg with respect to the member, means coacting with the leg and member for maintaining the leg interlocked with the teeth of the flanges, and a ground working member carried by the leg.

In testimony whereof I hereunto affix my signature.

JOHN B. MACKEY.